Jan. 13, 1953 W. L. HUNTINGTON 2,625,437
ANTIDRIBBLE VALVE
Filed Sept. 9, 1949

Inventor
WILLIAM L. HUNTINGTON
By George H. Fisher
Attorney

Patented Jan. 13, 1953

2,625,437

UNITED STATES PATENT OFFICE 2,625,437

ANTIDRIBBLE VALVE

William L. Huntington, Minneapolis, Minn., assignor to Minneapolis-Honeywell Regulator Company, Minneapolis, Minn., a corporation of Delaware Application September 9, 1949, Serial No. 114,716

6 Claims. (Cl. 299—150)

1

This invention relates to a snap-acting pressure limiting valve for use on oil burners to establish a sufficiently high oil pressure for proper operation of the oil burner nozzle.

The oil burners that are currently being used in most heating systems are usually fed oil by a pump through a suitable conduit to the nozzle of the oil burner. Upon starting the pump, the fuel in the conduit between the pump and the nozzle starts to drip from the nozzle before pressure in the conduit has filled up to a sufficient amount to cause the proper spraying or atomizing of the oil by the nozzle. Likewise, when there is a call for no heat, the pump will be deenergized and gradually slow down and, thus, again cause dripping of the oil from the nozzle, when the pressure has dropped below that sufficient for proper atomization by the nozzle. This causes an undesirable or dangerous accumulation of oil in the bottom of the furnace, if the oil failed to ignite when so dribbling, or if it did ignite, causes improper and sooty burning thereof.

One of the objects of this invention is to provide a snap-acting pressure limiting valve for use with oil burner nozzles to establish a sufficiently high oil pressure at the nozzle, upon the opening of the valve, to give immediate and proper atomization or spraying of the oil, and a clean and sharp cutoff of the oil to prevent dripping, when the valve closes.

Another object of the invention is to provide an inexpensive and compact anti-dribble valve which is adapted for use with a plurality of different types of burner nozzles currently on the market.

Another object of the invention is to provide a snap-acting valve that is easily assembled and disassembled and wherein the moving parts thereof are of simple but sturdy and reliable structure.

Still another object of the invention is to provide a snap-acting valve which is of such small dimensions and shape that it is adaptable for insertion in the fuel supply line of existing oil burner installations.

A still further object of the invention is to provide an anti-drip valve having a construction or an arrangement of parts that is adapted for use with various types of oil burner nozzles without creating undesirable air pockets between the valve and the tip of the nozzle being used.

An additional object of the invention is to provide a snap-acting valve, having a low differential of actuating pressures for the valve, wherein the snap-acting means in the valve closed position is at a point which causes said means to move rapidly to valve open position upon only a slight initial movement thereof in that direction from said valve closed position.

2

Other objects of the invention will become apparent upon reading the following detailed description of the invention in conjunction with the accompanying drawings wherein.

Figure 1:
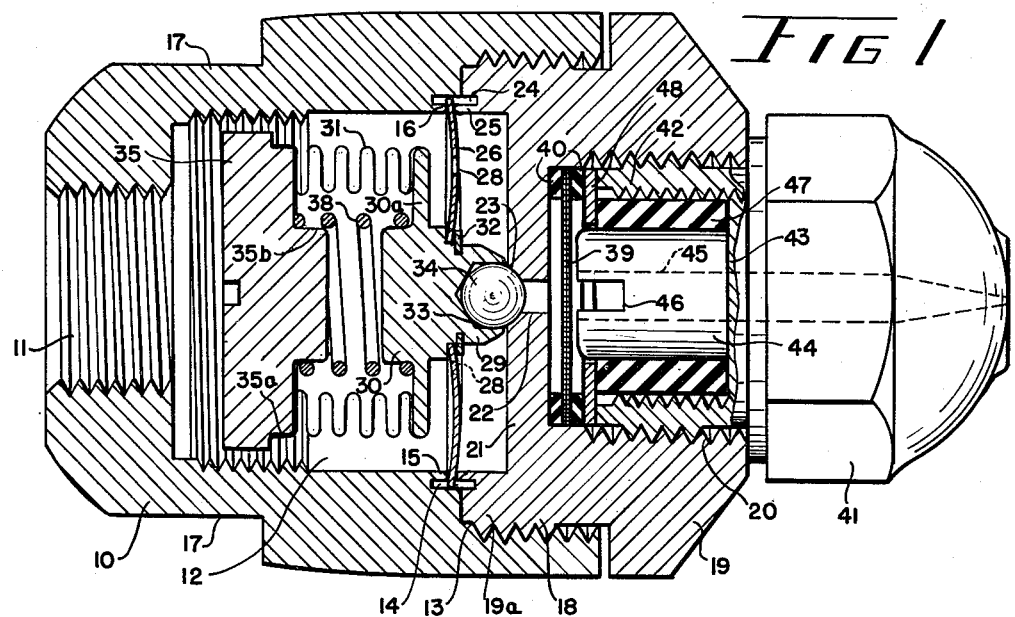
Figure 1 is a vertical sectional view of the antidribble valve shown connected to one type of burner nozzle that is partly broken away.
Figure 2:
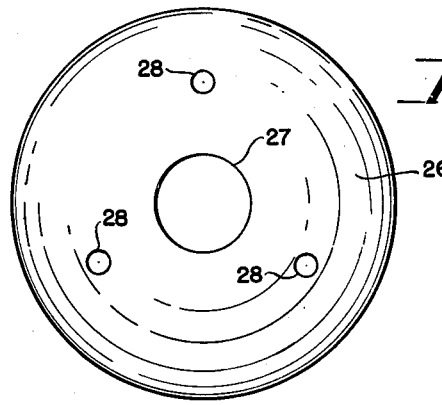
Figure 2 is an elevational view of a snap-disc which forms a part of the valve.

Referring to Figure 1 of the drawing, the body of the anti-dribble valve consists of a generally cylindrical casting 10 having a threaded inlet 11, an enlarged and partially threaded recess 12 and a still further enlarged and threaded recess 13 at the opposite end thereof from the inlet. An undercut annular recess 14 in the casting 10 at the junction of the bore 12 with the bore 13, provides an annular rib 15 having a rounded bearing surface 16, for purposes to be described hereinafter. The exterior surface of the casting 10 is flattened on two sides thereof as shown at 17 to provide wrench gripping surfaces.

Screw-threaded into the threaded bore 13 of the casting 10 is the threaded base portion 18 of a generally cup-shaped casting 19. This cylindrical wall 20 of the casting is screw-threaded almost to the bottom wall thereof. An outlet passage 22 through the bottom of the casting 19 is flared outwardly at 23 to provide a valve seat; a rib portion 19a extends axially from the bottom of the cup-shaped casting 19 and is adapted to sealingly bear against the bottom of recess 13 in the casting 10. The rib 19a has an annular groove in the bearing surface in alignment with the annular groove 14 in the casting 10 which, similar to said groove 14, provides an annular bearing rib 25 spaced from but in alignment with the rib 16 on the casting 10.

Pivotally positioned between the bearing ribs 15 and 25 is a lense-shaped disc 26, of steel or other suitable material, which has a large central aperture 27 and three radially and symmetrically spaced smaller fluid flow apertures 28. This disc is of the well known snap-action type and is adapted to pivot on the bearing ribs 15 and 25 snapping from one position to another upon suitable pressures being applied to the center portion thereof.

Extending through the central aperture 27 of the disc 26, is the reduced end portion 29 of a rigid end wall 30 of a bellows 31. The disc is held against the wall 30 by means of a well known clip washer 32 fitted in an annular groove in the reduced end portion 29. An axial bore 33 in the reduced end portion 29 contains a ball valve 34, which is retained therein by the rim of the bore 33 being inwardly deformed around the ball valve, outwardly of the center of the ball. It is thus seen that the snap disc 26 positions the ball valve 34 in axial alignment with the valve seat 23 by centering the end wall 30 of the bellows in the recess 12.

Figure 3:
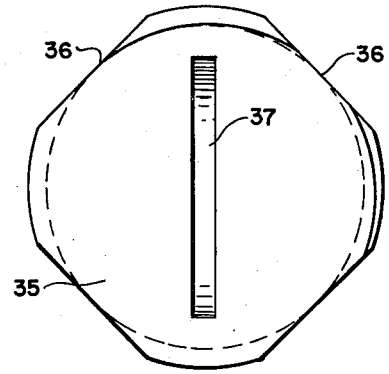
Figure 3 is an elevational view of the adjustable end of a pressure responsive means for the main valve.

The bellows 31 is of conventional construction and is axially and concentrically disposed within the recess 12. The valve end of the bellows 31 is soldered or otherwise secured to a radially extending flange portion 30a on the end wall 30. The other end of the bellows, the end nearest the inlet 11, is secured to an annular shoulder portion 35a of an adjustable end wall member 35. This end wall is externally threaded for engagement with the screw-threads in the recess 12, to provide axial adjustment thereof with respect to said recess. It can be seen in Figure 3, that the member 35 is flattened on four sides at 36 to provide oil flow passages from the inlet 11 to the recess 12. The end surface of the member 35 has an arcuate groove 37 centrally thereof in alignment with the inlet 11, which provides ready adjustment of the wall 35 in the recess 12 by means of a screw driver inserted through the inlet 11. Centrally disposed in the bellows 31 is a compression coil spring 38 surrounding the inner end portions of the wall 30 at one of its ends and surrounding an axially extending boss 35b on the member 35 at its other end. This spring bears against the end walls 30 and 35 to normally urge the ball valve 34 into seating engagement with the valve seat 23. The seating pressure of the ball valve on the seat 23 may be varied by screw-threading the end wall 35 axially of the recess 12. During this adjustment, the end wall 30 will rotate in the central aperture 27 of the snap disc and on the ball valve.

The reactive force of the valve seat 23 against the valve 34, due to their positions relative to said nibs 16 and 25 is designed to flex the disc to or nearly to its normal snapping position. The loading of the spring 38 is such that the pressure on the bellows 31 may closely approach the valve opening pressure before there is any movement of the valve. Then, with only a slight additional force on the bellows, the disc will move slightly and cause the negative force of the disc to quickly move the valve open against the action of the spring 38.

Positioned at the bottom of the threaded recess or bore 20, is a filter screen 39, which is spaced from the bottom of the recess by means of a thin soft washer. The washer is made of synthetic rubber or other suitable material and is of large internal diameter to expose a wide filtering area of the screen 39 to the oil flowing through the outlet 22.

Screw-threaded into the recess 20 is a conventional nozzle 41. This nozzle has an inwardly extending cylindrical portion 42 which is internally and externally threaded. A removable plug member 43, having an inner member or stem portion 44 spaced radially inwardly from the cylindrical portion or shank 42, has an axially extending oil flow passage 45 therein, which extends to the orifice of the nozzle. The stem 44 terminates a spaced distance from the filter screen 39 and is notched at 46 to receive a screw driver for assembly purposes.

In order to reduce the amount of air that may be trapped between the valve 34 and the nozzle orifice, which would provide an air cushion that would tend to cause dribbling of oil out of the orifice after the valve has closed, a filler sleeve 47 substantially fills the space between the cylindrical portion 42 and the stem 44. A second washer 40 and a brass washer 48 likewise fill up some of the space in the recess 20 and serve to firmly hold and space the screen filter 39 from the end of stem 44. Due to the compressibility of the washers 40, it will be seen that variation in the length of the cylindrical portion 22 of the nozzle may be tolerated without materially affecting the sealing and spacing functions of the washers 40.

Figure 4:
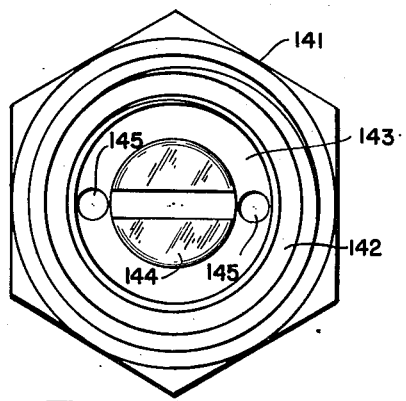
Figure 4 is an end view of a different type of oil burner nozzle that may be used with the antidribble valve.

In the event that a different nozzle, such as that shown in Figure 4, is to be used with the anti-dribble valve, it is only necessary that the filler sleeve 47 be not used. As can be seen in Figure 4, the modified nozzle 141 has two small diametrically spaced oil flow passages 145 extending through the plug 143, from the space between the stem 144 and the cylindrical wall portion 142, to the nozzle orifice. It is obvious that the use of the filler sleeve 47 in a nozzle of this type, would seal the oil flow passages 145 and prevent the flow of oil to the nozzle orifice. Nozzles of this type do not tend to trap air, either because one of the passages 145 is usually in a high position in the recess 20, or, due to the more turbulent flow of oil through the smaller passages in this type, as compared with the flow through the first described nozzle in Figure 1, the air will be picked up initially by the oil flowing through the assembly, leaving only oil therein when the valve shuts off.

*Operation*

With the above described anti-dribble valve installed in the nozzle supply line of an oil burner installation, either with the nozzle threaded into the recess 20, as illustrated in Figure 1, or in the conduit leading to the nozzle, the operation of the valve will be as follows:

Upon a call for heat by a room thermostat, the fuel pump will become energized and start to build up pressure in the supply line to the nozzle. The ball valve 34 will remain seated against the seat 23 until a sufficient pressure, as for example 95 pounds per square inch, has built up in the chamber or recess 12 to cause compression of the bellows 31 against the bias of spring 38 and the flexing bias of the snap disc 26. When this pressure has been reached, the snap disc crosses dead center to its open position. Oil will then flow through the inlet 11 along the flat surfaces 36 on the end wall 35, through recess 12, through openings 28 in the snap disc, through outlet 20, through filter 39 and through the passage 45 and the orifice of the nozzle. This will cause an instantaneous desired spray at the nozzle which will give the best and most efficient burning of the oil.

When the room thermostat has become satisfied, indicating that no heat is needed, the fuel pump will become deenergized causing a gradual decrease in the fuel pressure in the chamber or recess 12. The bellows 31 will not immediately move the ball valve to its closed position upon this slow decrease in pressure, because of the fluxing force exerted by the snap disc tending to retain the ball valve in its open position against the bias of spring 38. Only when a predetermined differential pressure (about 15 pounds per square inch) has been reached, that is, when the pressure has lowered to 80 pounds per square inch, the spring 38 will be able to force the snap disc through center back to seating engagement of the valve on the valve seat. While the cut-in and cut-out pressures may be varied from that described above, the cut-out pressure should be maintained sufficiently high so as to assure proper spraying of the oil by the nozzle up until the oil supply is cut off. This assures a clean and sharp cutoff of the nozzle oil supply.

While I have described the preferred embodiment of my invention, it will be apparent to those skilled in the art that other modifications may be made without departing from the spirit of the invention. It is therefore to be understood that the scope of the invention is to be determined solely by the appended claims.

I claim:

1. A control device for liquid fuel comprising a hollow valve body having a coaxial inlet and outlet, a valve seat between said inlet and said outlet, a valve cooperable with said seat, pressure responsive means within said body between said inlet and outlet and operably associated with said valve, and an apertured snap-acting disc coaxial with said inlet and outlet and cooperable with said pressure responsive means and valve to cause quick opening of said valve at one predetermined pressure and quick closing thereof at another predetermined pressure, said snap-acting disc having its outer edge portion engaging said valve body and its central portion connected to said pressure responsive means and being so adjusted that in the valve closed position it is substantially at its snapping position so that a slight valve opening movement thereof is sufficient to cause it to move said valve to a wide open position rapidly.

2. An anti-dribble oil burner nozzle assembly, comprising, in combination, a valve body having a passage therethrough terminating in a threaded bore, an oil burner nozzle having a shank threaded into said bore, a pair of compressible annular gaskets between the bottom of said bore and the end of said shank for sealing the connection between the valve body and the end of said shank and for filling part of the space therebetween to prevent the collection of a substantial amount of air in said space, a filter between said gaskets, said shank being in the form of an annular portion and an inner member concentric therewith and spaced therefrom, said inner member having an oil receiving opening, a removable annular filler member between said inner member and the inner surface of said shank for filling the space therebetween to prevent the collection of air therein, a valve in the passage of said valve body to control flow to the bore thereof, and quick acting pressure responsive means in said valve body for quickly opening and closing said valve upon increase and decrease of pressure in said passage.

3. An anti-dribble oil burner nozzle assembly, comprising, in combination, a valve body having a passage therethrough terminating in a threaded bore, an oil burner nozzle having a shank threaded into said bore, a compressible annular gasket between the bottom of said bore and the end of said shank for sealing the connection between the valve body and the end of said shank and for filling part of the space therebetween to prevent the collection of a substantial amount of air in said space, said shank being in the form of an annular portion and an inner member concentric therewith and spaced therefrom, said inner member having an oil receiving opening, a removable annular filler member between said inner member and the inner surface of said shank for filling the space therebetween to prevent the collection of air therein, a valve in the passage of said valve body to control flow to the bore thereof, and quick acting pressure responsive means in said valve body for quickly opening and closing said valve upon increase and decrease of pressure in said passage.

4. An anti-dribble adapter for use with oil burner nozzles of various constructions, comprising, a valve body having a passage therein terminating in a threaded bore for receiving an oil burner nozzle of the type formed of outer and inner members with an annular space therebetween, a pair of compressible annular gaskets seated in the bottom of said bore to provide a seal and to fill up a portion of any space between the bottom of said bore and the end of the oil burner nozzle when an oil burner nozzle is applied thereto, a filter located between said gaskets and retained in place thereby, a removable annular filler member in said bore adapted to fill the annular space between the outer and inner members of an oil burner nozzle, a valve for controlling flow through said passage, and quick acting pressure responsive means for opening said valve upon rise in pressure in said passage to a predetermined value and for closing said valve upon fall in pressure to a lower value.

5. A control device for liquid fuel comprising a hollow valve body having an inlet and an outlet, a valve seat between said inlet and said outlet, a valve cooperable with said seat, pressure responsive means within said bodies between said inlet and outlet and operably associated with said valve, said pressure responsive means including means normally biasing said valve closed, and an apertured snap-acting disc cooperable with said pressure responsive means and valve to cause quick opening of said valve at one predetermined pressure and quick closing thereof at another predetermined pressure, said snap-acting disc having its outer edge portion engaging said valve body and its central portion connected to said pressure responsive means and being so adjusted that in the valve closed position it is substantially at its snapping position so that a slight valve opening movement thereof is sufficient to cause it to move said valve to a wide open position rapidly.

6. A control device as defined in claim 5 wherein said valve body is formed of two mating parts having opposed annular ridges thereon engaging opposite sides of said outer edge portion of said snap-acting disc.

WILLIAM L. HUNTINGTON.

REFERENCES CITED

The following references are of record in the file of this patent:

UNITED STATES PATENTS

| Number | Name | Date |
|---|---|---|
| 458,014 | Caswell | Aug. 18, 1891 |
| 1,668,001 | Bolling | May 1, 1928 |
| 1,670,318 | Shaff | May 22, 1928 |
| 1,865,390 | Ballard | June 28, 1932 |
| 1,934,548 | Kellogg | Nov. 7, 1933 |
| 2,179,184 | Hodge | Nov. 7, 1939 |
| 2,199,454 | Andler et al. | May 7, 1940 |
| 2,414,544 | Moore | Jan. 21, 1947 |